(12) United States Patent
Ahn (10) Patent No.: US 12,260,775 B2
(45) Date of Patent: Mar. 25, 2025

(54) APPARATUS FOR BRAILLE INPUT AND METHOD THEREOF

(71) Applicant: Braillist Inc., Incheon (KR)

(72) Inventor: Jae Woo Ahn, Seongnam-si (KR)

(73) Assignee: Braillist Inc., Incheon (KR)

( * ) Notice: Subject to any disclaimer, the term of this patent is extended or adjusted under 35 U.S.C. 154(b) by 1246 days.

(21) Appl. No.: 16/965,300

(22) PCT Filed: Jan. 31, 2019

(86) PCT No.: PCT/KR2019/001395
§ 371 (c)(1),
(2) Date: Feb. 11, 2021

(87) PCT Pub. No.: WO2019/151809
PCT Pub. Date: Aug. 8, 2019

(65) Prior Publication Data
US 2021/0183266 A1    Jun. 17, 2021

(30) Foreign Application Priority Data

Jan. 31, 2018 (KR) .......................... 10-2018-0012014

(51) Int. Cl.
*G09B 21/02* (2006.01)
*G06F 3/02* (2006.01)

(52) U.S. Cl.
CPC ........... *G09B 21/02* (2013.01); *G06F 3/0219* (2013.01)

(58) Field of Classification Search
CPC ..... G09B 21/02; G09B 21/003; G06F 3/0219; H04M 1/2476; H04M 1/23; H04B 1/3827
USPC .......................................................... 434/113
See application file for complete search history.

(56) References Cited

U.S. PATENT DOCUMENTS

| 7,952,495 | B1 * | 5/2011 | McDonald | ........... | G09B 21/025 |
| | | | | | 382/114 |
| 2006/0280294 | A1 * | 12/2006 | Zhang | ............... | H04M 1/72481 |
| | | | | | 379/52 |
| 2011/0020771 | A1 * | 1/2011 | Rea | ......................... | G09B 21/02 |
| | | | | | 434/114 |
| 2012/0129568 | A1 * | 5/2012 | Mahalingam | ......... | G06F 3/0238 |
| | | | | | 341/22 |

* cited by examiner

*Primary Examiner* — Robert P Bullington
*Assistant Examiner* — Stephen Alvesteffer
(74) *Attorney, Agent, or Firm* — PnK IP LLC (57) ABSTRACT

A braille input device includes a keypad having a plurality of keys. The keypad includes: three left side corresponding keys corresponding to three dots disposed at a left side column of braille; three right side corresponding keys corresponding to three dots disposed at a right side column of braille; a plurality of left side multi keys, each left side multi key corresponding to two or more keys among the left side corresponding keys; and a plurality of right side multi keys, each right side multi key corresponding to two or more keys among the right side corresponding keys.

16 Claims, 4 Drawing Sheets

APPARATUS FOR BRAILLE INPUT AND METHOD THEREOF

CROSS REFERENCE TO RELATED APPLICATION

This U.S. National Stage Patent Application No. PCT/KR2019/001395, filed on Jan. 31, 2019, claims priority from and the benefit of Korean Patent Application No. 10-2018-0012014, filed on Jan. 31, 2018, each of which is hereby incorporated by reference for all purposes as if fully set forth herein.

BACKGROUND

Field

Exemplary implementations of the invention relate generally to a braille input device and a method thereof and more specifically, to a braille input device and a method thereof which enables a user to easily input braille.

Discussion of the Background

Braille devised for visually-handicapped persons has been known widely.

Different letters are formed through combination of six dots arranged in two columns. Consecutive three dots are arranged in each column.

Figure 1:
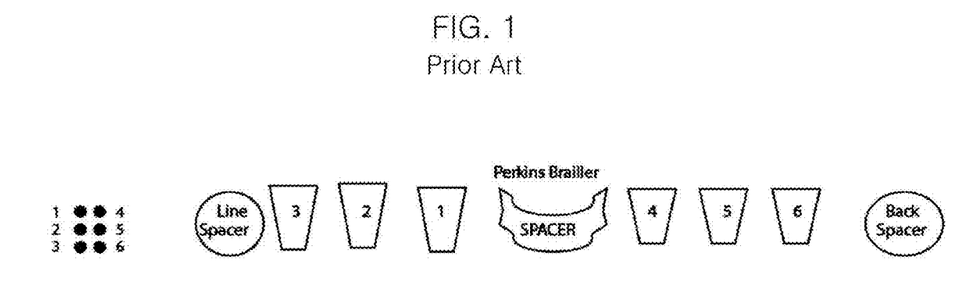
FIG. 1 shows an example of a configuration of braille and a conventional input device for inputting such braille.

FIG. 1 illustrates an example of the above-mentioned formation.

FIG. 1 shows an example of a configuration of braille and a conventional input device for inputting such braille.

Referring to FIG. 1, letters are formed using six dots as illustrated in the left side of FIG. 1.

Moreover, a conventional input device, for instance, a Perkins Braillier, for inputting braille includes a keypad as illustrated in the right side of FIG. 1.

That is, the conventional input device for inputting braille includes six keys corresponding to dots included in the braille illustrated in the left side of FIG. 1. Furthermore, a keypad having the same numbers as the dots indicated on the braille may be the keypad corresponding to the relevant dots.

In order to input wanted braille, a user can input wanted braille by inputting or selecting all or some of the six keys at the same time.

However, the conventional braille input device has a limitation in that the six keys must be arranged in a transverse direction as shown in FIG. 1 in order to input the six keys at the same time or in a horizontal direction with a bit of a curve so that the user can arrange his or her six fingers easily.

Therefore, if the user cannot use the six fingers at the same time, for instance, when the user cannot use many fingers at the same time while having the keypad with one hand, or when it is inconvenient or impossible to use many fingers at the same time, it is inconvenient to input braille.

Additionally, the conventional braille input device which has been devised specially in order to input braille is very high-priced and is incompatible since other characters, for instance, Korean characters, English alphabet, numbers and so on, except braille cannot be inputted.

That is, the visually-handicapped persons have to carry not only an input device for inputting characters except braille as well as the braille input device.

The above information disclosed in this Background section is only for understanding of the background of the inventive concepts, and, therefore, it may contain information that does not constitute prior art.

SUMMARY

Accordingly, the present invention has been made in an effort to solve the above-mentioned problems occurring in the prior arts, and it is an object of the present invention to provide a braille input device and a method of the braille input device, which includes a keypad enabling a user to easily input braille without using six fingers at the same time.

It is another object of the present invention to provide a braille input device and a method of the braille input device, which enables the user to simply and rapidly input all braille one by one just with two fingers.

It is a further object of the present invention to provide a braille input device and a method of the braille input device, which has compatibility so that the user can input not only braille but also other letters.

To achieve the above objects, the present invention provides a braille input device including a keypad having a plurality of keys, wherein the keypad includes: three left side corresponding keys corresponding to three dots located at a left side column of braille; three right side corresponding keys corresponding to three dots located at a right side column of braille; a plurality of left side multi keys corresponding to two or more keys among the left side corresponding keys; and a plurality of right side multi keys corresponding to two or more keys among the right side corresponding keys.

The braille input device outputs a signal to input braille having dots corresponding to the keys selected at the same time.

The left side corresponding keys or the right side corresponding keys are arranged in a row, and the left side corresponding keys or the right side corresponding keys are arranged consecutively.

The left multi keys are arranged on the left side multi key column which is one column existing at the left side of a left side corresponding key column having the left side corresponding keys, and the right multi keys are arranged on the right side multi key column which is one column existing at the right side of a right side corresponding key column having the right side corresponding keys.

The first left side multi key located at the uppermost end among the left side multi keys or the first right side multi key located at the uppermost end among the right side multi keys corresponds to the first left side corresponding key located at the top among the left side corresponding keys and the second left side corresponding key located at the middle or corresponds to the first right side corresponding key located at the top among the right side corresponding keys and the second right side corresponding key located at the middle.

The second left side multi key located at the next upper end among the left side multi keys or the second right side multi key located at the next upper end among the right side multi keys corresponds to the first left side corresponding key located at the top among the left side corresponding keys and the third left side corresponding key located at the bottom, or corresponds to the first right side corresponding key located at the top among the right side corresponding keys and the third right side corresponding key located at the bottom.

The third left side multi key located at the third upper part among the left side multi keys or the third right side multi key located at the third upper part among the right side multi keys corresponds to all of the left side corresponding keys or all of the right side corresponding keys.

The fourth left side multi key located at the fourth upper part among the left side multi keys or the fourth right side multi key located at the fourth upper part among the right side multi keys corresponds to the second left side corresponding key located at the middle among the left side corresponding keys and the third left side corresponding key located at the bottom, or corresponds to the second right side corresponding key located at the middle among the right side corresponding keys and the third right side corresponding key located at the bottom.

The third left side multi key located at the third upper part among the left side multi keys or the third right side multi key located at the third upper part among the right side multi keys corresponds to the second left side corresponding key located at the middle among the left side corresponding keys and the third left side corresponding key located at the bottom, or corresponds to the second right side corresponding key located at the middle among the right side corresponding keys and the third right side corresponding key located at the bottom.

The fourth left side multi key located at the fourth upper part among the left side multi keys or the fourth right side multi key located at the fourth upper part among the right side multi keys corresponds to all of the left side corresponding keys or all of the right side corresponding keys.

The keypad includes the left side corresponding keys, the right side corresponding keys, the left side multi keys, or mode change keys for converting the right side multi keys into keys for inputting other characters including alphabetical characters or numbers.

In another aspect of the present invention, to achieve the above objects, the present invention provides a braille input device including a keypad having a plurality of keys, wherein the keypad includes: six corresponding keys corresponding to six dots of braille; and a plurality of multi keys corresponding to two or more keys among the corresponding keys.

The braille input device outputs a signal to input braille having dots corresponding to the keys selected at the same time.

In a further aspect of the present invention, to achieve the above objects, the present invention provides a braille input device including a keypad having a plurality of keys, wherein the keypad includes: three left side corresponding keys corresponding to three dots located at a left side column of braille; three right side corresponding keys corresponding to three dots located at a right side column of braille; four left side multi keys corresponding to plural keys among the left side corresponding keys, wherein the four left side multi keys include three keys corresponding to two different keys among the left side corresponding keys and one key corresponding to all of the left side corresponding keys; and four right side multi keys corresponding to plural keys among the right side corresponding keys, wherein the four right side multi keys include three keys corresponding to two different keys among the right side corresponding keys and one key corresponding to all of the right side corresponding keys.

In a still further aspect of the present invention, to achieve the above objects, the present invention provides a braille input method including the steps of inputting at least one key of a keypad of a braille input device by a user; and outputting an input signal for inputting braille, which has the dot corresponding to the at least one key inputted into the braille input device, to the host device, wherein the at least one key includes any one among three left side corresponding keys corresponding to three dots located at the left side column of braille and a plurality of left side multi keys corresponding to two or more keys of the left side corresponding keys and any one among three right side corresponding keys corresponding to three dots located at the right side column of braille and a plurality of right side multi keys corresponding to two or more keys of the right side corresponding keys.

The left side multi keys includes three keys corresponding to two different keys among the left side corresponding keys and one key corresponding to all of the left side corresponding keys, and the right side multi keys includes three keys corresponding to two different keys among the right side corresponding keys and one key corresponding to all of the right side corresponding keys.

In another aspect of the present invention, to achieve the above objects, the present invention provides a braille input method including the steps of: inputting at least one key of a keypad of a braille input device by a user; and outputting an input signal for inputting braille, which has the dot corresponding to the at least one key inputted into the braille input device, to the host device, wherein the at least one key includes a multi key corresponding to two or more keys among six corresponding keys corresponding to six dots of braille.

The braille input device and the method of the braille input device according to the present invention enable the user to easily input braille without using six fingers at the same time.

Especially, the braille input device and the method of the braille input device according to the present invention enable the user to simply and rapidly input all or part of braille one by one just with two fingers.

Furthermore, the braille input device and the method of the braille input device according to the present invention provide compatibility so that the user can input not only braille but also other letters.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

The invention can be modified in various forms and can have various embodiments. Specific embodiments will be illustrated in the drawings and described in detail. However, the embodiments are not intended to limit the invention, but it should be understood that the invention includes all modifications, equivalents, and replacements belonging to the concept and the technical scope of the invention. When it is determined that detailed description of known techniques involved in the invention makes the gist of the invention obscure, the detailed description thereof will not be made.

It will be understood that terms, such as "first" or "second" may be used in the specification to describe various components but are not restricted to the above terms. The terms may be used to discriminate one component from another component.

It will be further understood that the words or terms used in the present invention are used to describe specific embodiments of the present invention and there is no intent to limit the present invention. The singular form of the components may be understood into the plural form unless otherwise specifically stated in the context.

It should be also understood that the terms of 'include' or 'have' in the specification are used to mean that there are characteristics, numbers, steps, operations, components, parts, or combinations of the steps, operations, components and parts described in the specification and there is no intent to exclude existence or possibility of other characteristics, numbers, steps, operations, components, parts, or combinations of the steps, operations, components and parts.

Moreover, in this description, when a certain component 'transfers' data to another component, it means that the certain component may directly transfer data to the another component or may indirectly transfer data to the another component through a further component. On the contrary, when a certain component 'directly transfers' data to another component, it means that the certain component transfers data to the another component without going through a further component.

Hereinafter, exemplary embodiments of the invention will now be described in detail with reference to the attached drawings, in which like reference numbers express corresponding parts throughout the drawings.

Figure 2:
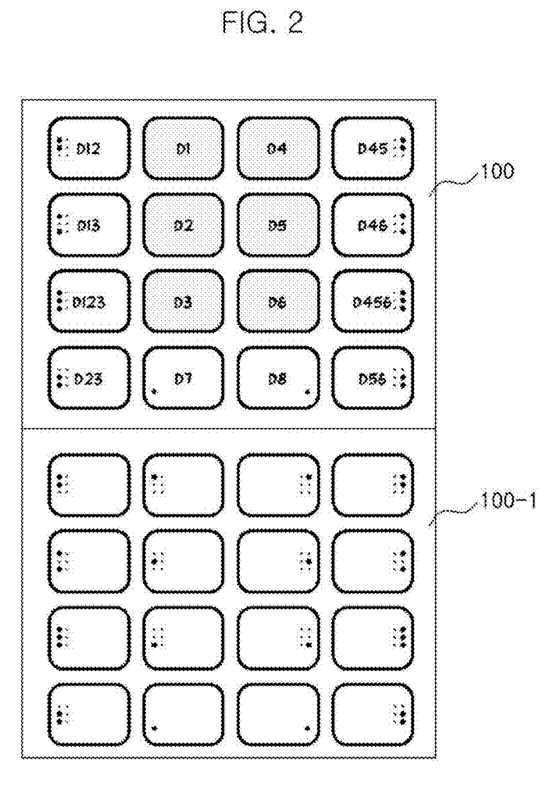
FIG. 2 is a view illustrating an arrangement form of an exemplary embodiment of a keypad of a braille input device constructed according to the principles of the invention.

FIG. 2 is a view illustrating an arrangement form of an exemplary embodiment of a keypad of a braille input device constructed according to the principles of the invention.

Referring to FIG. 2, a keypad 100 included in the braille input device according to the exemplary embodiment may be a keypad illustrated in FIG. 2.

FIG. 2 illustrates the keypad 100 with a 4×4 matrix with four columns and four rows, but the keypad 100 may have the numbers of rows and columns more or less than those of the 4×4 matrix. Furthermore, for instance, another keypad 100-1 indicates only braille corresponding to keys of the keypad 100-1.

Hereinafter, it is described exemplarily that the keypad 100 according to the exemplary embodiment has four rows and four columns, but exemplary embodiments are not limited thereto.

The keypad 100 includes four rows and four columns as shown in the drawing, and keys D1 to D6 among the keys correspond to six dots included in braille. For example, each of the keys D1 to D6 may be a Braille pattern dots-6 (e.g., a 6-dot braille cell). However, exemplary embodiments are not limited thereto. For example, each of the keys D1 to D6 may be a Braille pattern dots-8 (e.g., an 8-dot braille cell). Further, each of the keys D1 to D6 may have various Braille patterns.

It is defined that such keys D1 to D6 are corresponding keys in this description.

The corresponding keys D1 to D6 may be arranged to have corresponding relationship to each other according to positions of the six dots of braille (e.g., the braille pattern).

For instance, the first dot of braille may be a dot located at the top of the left side of the braille pattern, and the key corresponding to the first dot may be the key D1 located at the top of the left side among the corresponding keys D1 to D6.

The second dot of braille may be a dot located at the middle of the left side of the braille pattern, and the key corresponding to the second dot may be the key D2 located at the middle of the left side among the corresponding keys D1 to D6.

That way, the fourth dot of braille may be a dot located at the top of the right side of the braille pattern, and the key corresponding to the fourth dot may be the key D4 located at the top of the right side among the corresponding keys D1 to D6.

Finally, the corresponding keys D1 to D6 are mapped to maintain the position relationship among the dots of braille, so that the user can easily recognize the keys corresponding to the dots intuitively.

For example, it is not necessary that the six corresponding keys D1 to D6 are all arranged in a consecutive order and are crowded as shown in FIG. 2, and other keys, namely, keys which do not correspond to the dots of braille, may be arranged among the corresponding keys D1 to D6. For example, another key may exist among the left side corresponding keys D1 to D3, or may exist among the right side corresponding keys D4 to D6.

However, for convenience in description, as shown in FIG. 2, it is described that the corresponding keys D1 to D6 are crowded, namely, the left side corresponding keys D1 to D3 are consecutively arranged in a column and the right side corresponding keys D4 to D6 are also consecutively arranged in a column, and the left side corresponding keys D1 to D3 and the right side corresponding keys D4 to D6 are arranged in adjoining columns.

For example, according to an exemplary embodiment, the corresponding keys D1 to D6 may be divided into the left side corresponding keys D1 to D3 and the right side corresponding keys D4 to D6.

For the user's intuitiveness, the left side corresponding keys D1 to D3 may be arranged in one column on the keypad 100 (hereinafter, called as 'left side corresponding key column').

Additionally, the right side corresponding keys D4 to D6 may be arranged in one column on the keypad 100 (hereinafter, called 'right side corresponding key column').

In addition, according to an exemplary embodiment, as shown in FIG. 2, the keypad 100 may further include left side multi keys, for instance, D12, D13, D123 and D23, corresponding to the plurality of keys among the left side corresponding keys D1 to D3.

So, when the user has to select the plurality of keys among the left side corresponding keys D1 to D3, the left side multi keys D12, D13, D123 and D23 are provided to enable the user to select just one key, namely, one of the left side multi keys corresponding to the plurality of keys in order to input braille even in a situation that it is difficult to use many fingers at the same time.

In the same way, the keypad 100 may further include right side multi keys, for instance, D45, D46, D456 and D56, corresponding to the plurality of keys among the right side corresponding keys D4 to D6.

Moreover, the left side multi keys D12, D13, D123 and D23 may exist at any positions on the keypad 100, but may be arranged in a column for the user's ease in inputting.

The column where the left side multi keys D12, D13, D123 and D23 are arranged is defined as a left side multi key column, and the left side multi key column may be located at the left side of the left side corresponding key column on which the left side corresponding keys D1 to D3 are arranged.

Furthermore, the column where the right side multi keys D45, D46, D456 and D56 are arranged is defined as a right side multi key column, and the right side multi key column may be located at the right side of the right side corresponding key column on which the right side corresponding keys D4 to D6 are arranged.

Additionally, the left side multi key column may be a left side column adjacent to the left side corresponding key column, and the right side multi key column may be a right side column adjacent to the right side corresponding key column.

As described above, the left side multi keys D12, D13, D123 and D23 and/or the right side multi keys D45, D46, D456 and D56 may be arranged in one column, so that the user can easily select any left side multi key or any right side multi key.

Moreover, an arrangement order of the left side multi keys D12, D13, D123 and D23 and/or the right side multi keys D45, D46, D456 and D56 may be related with the order of the left side corresponding keys D1 to D3 and/or the order of the right side corresponding keys D4 to D6.

For instance, because the left side corresponding keys D1 to D3 are three, there are four cases in order to select plural keys among the three corresponding keys. For example, there are total three cases to select different two keys and there is one case to select all of the three keys.

Therefore, there are four cases to select plural keys by different combinations of the three left side corresponding keys D1 to D3. For example, the right side corresponding keys D4 to D6 are selected in the same ways.

Therefore, according to the exemplary, the left side multi keys, namely, the number of the left side multi keys less than four, may be disposed just for some of the cases that the plural keys among the left side corresponding keys D1 to D3 are selected, but the four left side multi keys D12, D13, D 123 and D23 may be disposed on the keypad 100 in order to provide the left side multi keys corresponding to all of the cases that the plural keys among the left side corresponding keys D1 to D3 are selected.

Likewise, the right side multi keys, namely, the number of the right side multi keys less than four, may be disposed just for some of the cases that the plural keys among the right side corresponding keys D4 to D6 are selected, but the four right side multi keys D45, D46, D456 and D56 may be disposed on the keypad 100 in order to provide the right side multi keys corresponding to all of the cases that the plural keys among the right side corresponding keys D4 to D6 are selected.

Furthermore, the left side corresponding keys D1 to D3 (or the right side corresponding keys D4 to D6) corresponding to the left side multi keys D12, D13, D123 and D23 (or the right side multi keys D45, D46, D456 and D56) arranged in the left side multi key column (or the right side multi key column) may be determined according to the arrangement positions of the left side multi keys D12, D13, D123 and D23 (or the right side multi keys D45, D46, D456 and D56).

For example, as shown in FIG. 2, the first left side multi key D12 arranged at the uppermost end among the left side multi keys D12, D13, D123 and D23 may be the multi key corresponding to the first left side corresponding key D1 and the second left side corresponding key D2. It means that when the first left side multi key D12 is selected, the first dot corresponding to the first left side corresponding key D1 and the second dot corresponding to the second left side corresponding key D2 are selected at the same time.

Additionally, the second left side multi key D13 arranged at the next upper end among the left side multi keys D12, D13, D123 and D23 may be the multi key corresponding to the first left side corresponding key D1 and the third left side corresponding key D3. It means that when the second left side multi key D13 is selected, the first dot corresponding to the first left side corresponding key D1 and the third dot corresponding to the third left side corresponding key D3 are selected at the same time.

In addition, the third left side multi key D123 arranged at the third upper end among the left side multi keys D12, D13, D123 and D23 may be the multi key corresponding to all of the left side corresponding keys D1 to D3. It means that when the third left side multi key D123 is selected, the first dot corresponding to the first left side corresponding key D1, the second dot corresponding to the second left side corresponding key D2, and the third dot corresponding to the third left side corresponding key D3 are all selected at the same time.

Moreover, the fourth left side multi key D23 arranged at the lowermost end among the left side multi keys D12, D13, D123 and D23 may be the multi key corresponding to the second left side corresponding key D2 and the third left side corresponding key D3 and the third left side corresponding key D3 among the left side corresponding keys D1 to D3. It means that when the fourth left side multi key D23 is selected, the second dot corresponding to the second left side corresponding key D2 and the third dot corresponding to the third left side corresponding key D3 are selected at the same time.

In the same way as the left side multi keys D12, D13, D123 and D23, the right side multi keys D45, D46, D456 and D 56 may be related with the positions of the right side corresponding keys D4 to D6 in the arrangement order.

For instance, the first right side multi key D45 arranged at the uppermost end among the right side multi keys D45, D46, D456 and D56 may be the multi key corresponding to the first right side corresponding key D4 and the second right side corresponding key D5. It means that when the first right side multi key D45 is selected, the fourth dot corresponding to the first right side corresponding key D4 and the fifth dot corresponding to the second right side corresponding key D5 are selected at the same time.

In the same way, the second right side multi key D46 arranged at the next upper end among the right side multi keys D45, D46, D456 and D56 may be the multi key corresponding to the first right side corresponding key D4 and the third right side corresponding key D6. Furthermore, the third right side multi key D456 arranged at the third upper end among the right side multi keys D45, D46, D456 and D56 may be the multi key corresponding to all of the right side corresponding keys D4 to D6. Additionally, the four right side multi keys D56 arranged at the lowermost end among the right side multi keys D45, D46, D456 and D56 may be the multi key corresponding to the second right side corresponding key D5 and the third right side corresponding key D6 among the right side corresponding keys D4 to D6.

As described above, because the positions of the left side multi keys D12, D13, D123 and D23 and/or the right side multi keys D45, D46, D456 and D56 are related with the positions of the corresponding keys, the user can intuitively grasp the combination of the dots selected by the multi keys.

For example, the left side corresponding keys D1 to D3 corresponding to the third left side multi key D123 or the right side corresponding keys D4 to D6 corresponding to the third right side multi key D456 illustrated in FIG. 2 may be different from exemplary embodiments of FIG. 2.

Figure 3:
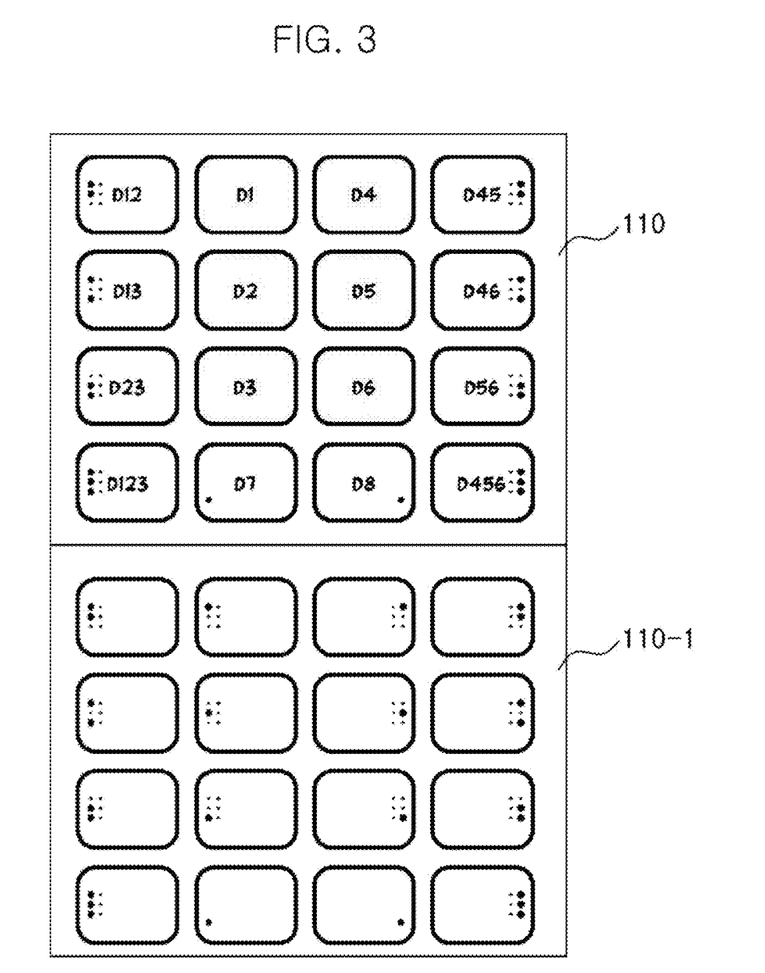
FIG. 3 is a view illustrating an arrangement form of another exemplary embodiment of the keypad of the braille input device of FIG. 2.

For example, the keypad illustrated in FIG. 2 may have an arrangement which is easy to use actually, but another keypad 110 illustrated in FIG. 3 may be used in order to enhance intuitiveness of the third left side multi key and the third right side multi key.

FIG. 3 is a view illustrating an arrangement form of another exemplary embodiment of the keypad of the braille input device of FIG. 2. The keypad 110 illustrated in FIG. 3 has modified forms of the third left side multi key (or the third right side multi key) and the fourth left side multi key (or the fourth right side multi key) of FIG. 2. A keypad 110-1 is a keypad showing only the arrangement of braille corresponding to the keypad illustrated at the upper part of FIG. 3.

Furthermore, as shown in FIG. 3, the corresponding relationship that the third left side multi key D23 corresponds to the second left side corresponding key D2 and the third left side corresponding key D3 may be more intuitive considering the relationship of the first left side multi key D12 and the second left side multi key D13. Additionally, in this instance, the fourth left side multi key D123 may be the key corresponding to all of the left side corresponding keys D1 to D3.

Likewise, the corresponding relationship that the third right side multi key D56 corresponds to the second right side corresponding key D5 and the third right side corresponding key D6 may be more intuitive considering the relationship of the first right side multi key D45 and the second right side multi key D46. Additionally, in this instance, the fourth right side multi key D456 may be the key corresponding to all of the right side corresponding keys D4 to D6.

However, braille made by selecting all of the first, second and third dots is used more frequently than braille made by selecting the second dot and the third dot at the same time and selection of the key located at the third upper part is easier than selection of the key located at the fourth upper part. So, the keypad 100 shown in FIG. 2 is easier to use.

Finally, if necessary, the corresponding key corresponding to the third multi key, for instance, D123 and D456 of FIG. 2 or D23 and D56 of FIG. 3, may be varied.

The keypad 100 or 110 of the braille input device according to the exemplary embodiment includes not only the corresponding keys D1 to D6 but also the multi keys corresponding to the plural keys among the corresponding keys D1 to D6 so as to provide easiness to use.

Especially, the corresponding keys D1 to D6 are divided into the left side corresponding keys D1 to D3 and the right side corresponding keys D4 to D6, and the left side multi keys D12, D13, D123 and D23 corresponding to the plural keys among the left side corresponding keys D1 to D3 and the right side multi keys D45, D46, D456 and D56 corresponding to the plural keys among the right side corresponding keys D4 to D6 are provided, so that the user can input braille, total 63 different kinds of braille, using two fingers.

Moreover, the left side multi keys D12, D13, D123 and D23 are arranged in any one column of the left side of the left side corresponding key column and are arranged consecutively in order to increase easiness to input. Furthermore, in order to enhance user intuitiveness, the left side corresponding keys D1 to D3 corresponding according to the arrangement positions of the left side multi keys D12, D13, D123 and D23 may be determined.

For example, the right side multi keys D45, D46, D456 and D56 are arranged in any one column of the right side of the right side corresponding key column and are arranged consecutively in order to increase easiness to input. Furthermore, in order to enhance user intuitiveness, the right side corresponding keys D4 to D6 corresponding according to the arrangement positions of the right side multi keys D45, D46, D456 and D56 may be determined.

Therefore, as shown in FIGS. 5, 6, 7, and 8, according to exemplary embodiments, when the input device is carried by the user to use, the user can input the braille at a time only using two fingers, for instance, the thumbs of both hands, after grasping the input device with two hands.

Furthermore, a signal for inputting braille having the dots corresponding to the keys selected simultaneously may be outputted to a host device, for instance, a computer, a printer, or a data processor. For example, the host device or a device connected with the host device can create braille.

For example, the braille input device according to the exemplary embodiment is very compatible since enabling the user to input not only braille but also other characters.

Now, referring to FIGS. 4, 5, 6, and 8, an example of the braille input device will be described.

Figure 4:
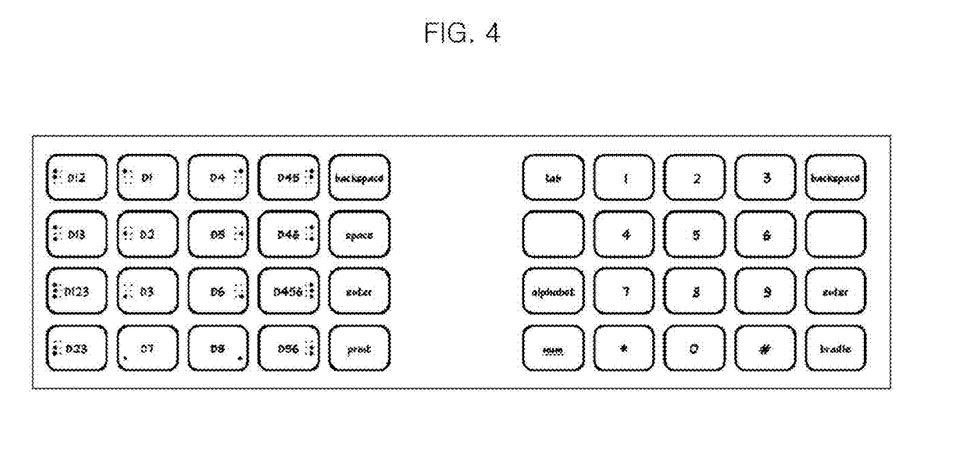
FIG. 4 is a view for explaining compatibility of the braille input device of FIG. 2.

FIG. 4 is a view for explaining compatibility of the braille input device of FIG. 2. As shown in FIG. 4, the braille input device according to the exemplary embodiment includes the corresponding keys D1 to D6, the multi keys D12, D13, D123, D23, D45, D46, D456 and D56, and mode change keys, e.g., the lowermost keys (print, and braille) of the right side illustrated in FIG. 4.

The mode change keys can convert the keypad of the braille input device into a keypad corresponding to other characters, for instance, Korean characters, English alphabet, and numbers.

For instance, in the braille input mode, the keypad of the braille input device according to the exemplary embodiment may correspond to inputted characters as shown in the left side of FIG. 4. However, when the user selects the mode change keys, the keypad can change the mode to correspond to the inputted characters illustrated in the right side of FIG. 4.

The input mode provided by the braille input device according to the exemplary embodiment is illustrated in FIGS. 5, 6, 7, and 8.

FIGS. 5, 6, 7, and 8 are views illustrating different modes of the braille input device of the FIG. 2.

Figure 5:
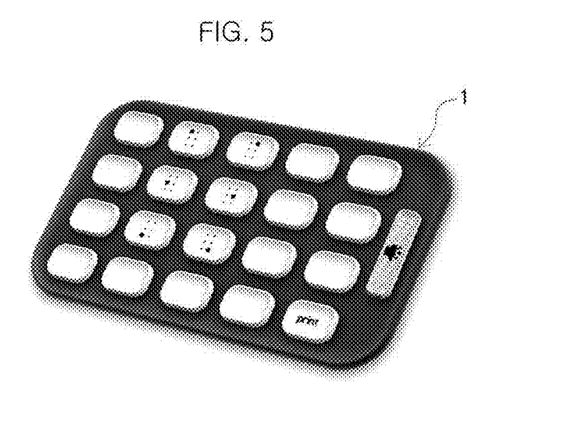
FIGS. 5, 6, 7, and 8 are views illustrating different modes of the braille input device of FIG. 2.
Figure 6:
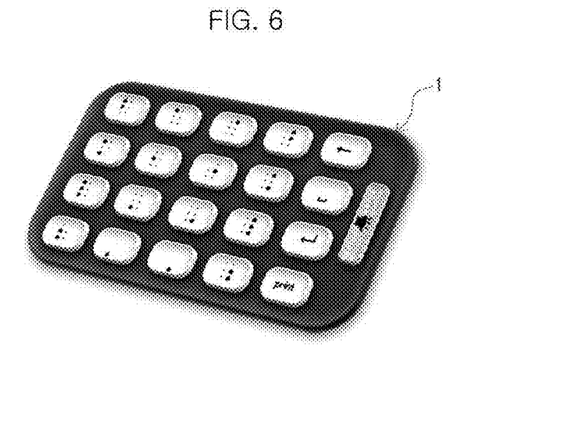

According to the exemplary embodiment, in a certain mode, as shown in FIG. 5, only the corresponding keys D1 to D6 can effectively operate on the keypad. In another mode, as shown in FIG. 6, the braille input device includes the multi keys D12, D13, D123, D23, D45, D46, D456 and D56 as well as the corresponding keys D1 to D6.

Figure 7:
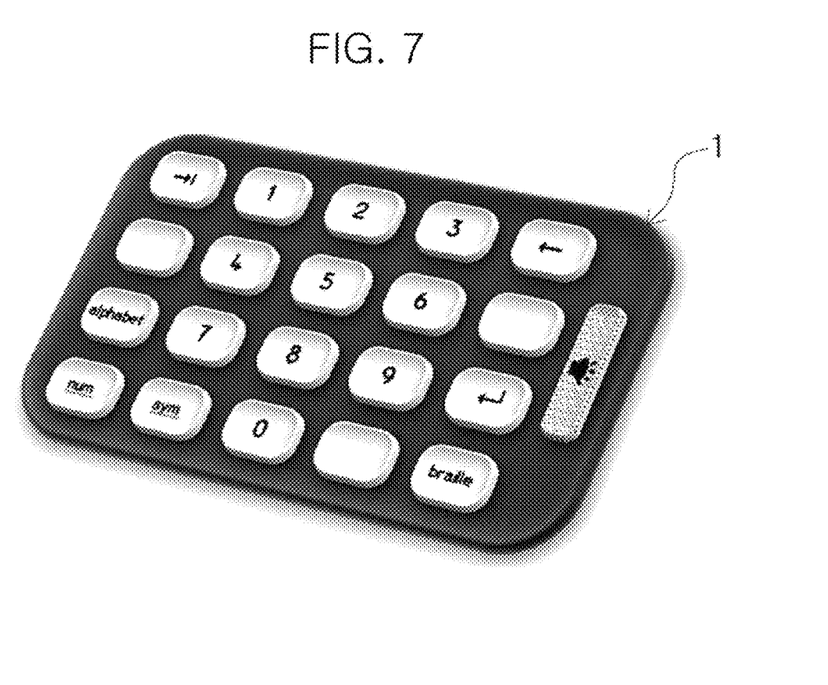
Figure 8:
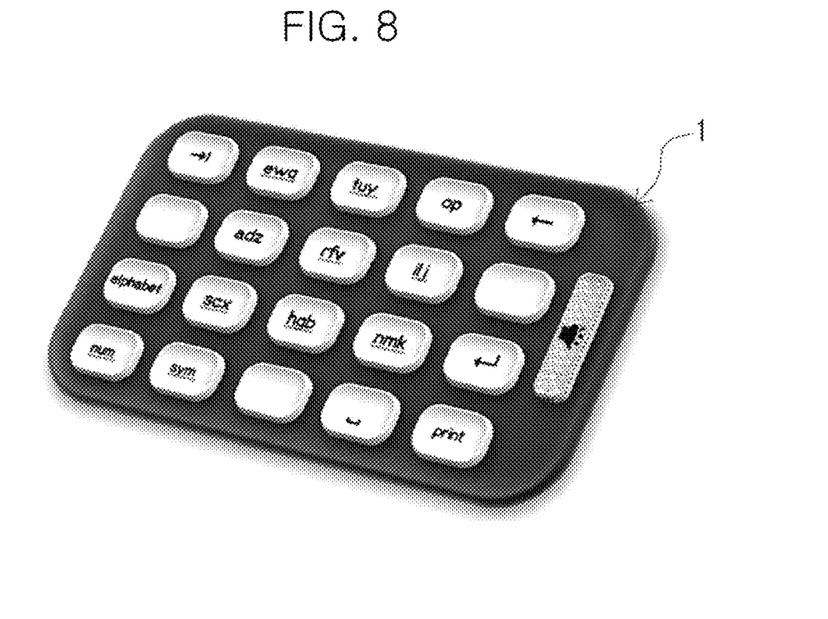

Moreover, in a further mode, the keypad may correspond to a number or symbol mode as shown in FIG. 7, and in a still further mode, the keypad may correspond to an alphabetical character mode as shown in FIG. 8.

Furthermore, as shown in the drawing, the braille input device 1 includes a speaker which converts inputted characters into TTS (Text to Speech) in order to output sound, so that visually-handicapped persons can easily use the braille input device.

A method of inputting braille according to the exemplary embodiment includes the steps of: inputting at least one key of the keypad of the braille input device by the user; and outputting an input signal for inputting braille, which has the dot corresponding to the at least one key inputted into the braille input device, to the host device. Additionally, the at least one key may include any one among the three left side corresponding keys corresponding to the three dots located at the left side column of braille and the left side multi keys corresponding to two or more keys of the left side corresponding keys and any one among the three right side corresponding keys corresponding to three dots located at the right side column of braille and the right side multi keys corresponding to two or more keys of the right side corresponding keys. For example, the user can select any one among the left side corresponding keys and the left side multi keys with one finger of the left hand. The user can select any one among the right side corresponding keys and the right side multi keys with one finger of the right hand.

In this instance, the left side multi keys may include three keys corresponding to two different keys of the left side corresponding keys and one key corresponding to all of the left side corresponding keys. Furthermore, the right side multi keys may include three keys corresponding to two different keys of the right side corresponding keys and one key corresponding to all of the right side corresponding keys.

A method of inputting braille according to another exemplary embodiment includes the steps of: inputting at least one key of the keypad of the braille input device by the user; and outputting an input signal for inputting braille, which has the dot corresponding to the at least one key inputted into the braille input device, to the host device. The at least one key may include a multi key corresponding to two or more keys among the six corresponding keys corresponding to the six dots of braille.

For example, the braille input method according to the exemplary embodiment is implemented in the form of a computer-readable program command and is stored into a computer-readable recording media, and a control program and a target program according to the exemplary embodiment can be stored in the computer-readable recording media. The computer-readable recording media may be one of recording devices of all kinds in which data readable by a computer system is stored.

The program command recorded in the recording media is specially designed and constructed for the present invention or is known to persons in the relevant field of software.

The computer-readable recording media may be a magnetic media such as a hard disk, a floppy disk or a magnetic tape, an optical media such as a CD-ROM or a DVD, a magneto-optical media such as a floptical disk, or a hardware device for storing and executing program commands, such as a ROM, a RAM or a flash memory. In addition, the computer-readable recording media is dispersed to computer systems connected with a network and can store and execute computer-readable codes in a dispersion fashion.

The program commands include not only machine language codes made by the compiler but also high-level language codes executable by a device for processing information electronically, for instance, a computer, using an interpreter.

The hardware device may run by one or more software modules in order to perform the actions of the present invention, and vice versa.

The above description is only exemplary, and it will be understood by those skilled in the art that the invention may be implemented in other concrete forms without changing the technological scope and essential features. Therefore, the above-described exemplary embodiments should be considered only as examples in all aspects and not for purposes of limitation. For example, each component described as a single type may be realized in a distributed manner, and similarly, components that are described as being distributed may be realized in a coupled manner.

The present invention is applicable to "a braille input device and a method thereof".

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A braille input device comprising:
a keypad having a plurality of keys,
wherein the keypad comprises:
three left side corresponding keys corresponding to three dots disposed at a left side column of braille;
three right side corresponding keys corresponding to three dots disposed at a right side column of braille;
a plurality of left side multi keys, each left side multi key corresponding to two or more keys among the left side corresponding keys; and
a plurality of right side multi keys, each right side multi key corresponding to two or more keys among the right side corresponding keys, and
wherein the plurality of left side multi keys and the plurality of right side multi keys are disposed at columns different from each other.

2. The braille input device of claim 1, wherein the braille input device is configured to output a signal to input braille having dots corresponding to keys selected at a same time.

3. The braille input device of claim 1, wherein the left side corresponding keys or the right side corresponding keys are arranged in a column.

4. The braille input device of claim 3, wherein the left side corresponding keys or the right side corresponding keys are arranged consecutively in the column.

5. The braille input device of claim 3, wherein the left side multi keys are arranged in a left side multi key column disposed at a left side of the left side corresponding keys.

6. The braille input device of claim 5, wherein a first left side multi key disposed at an uppermost end among the left side multi keys or a first right side multi key disposed at an uppermost end among the right side multi keys corresponds to a first left side corresponding key disposed at a top among the left side corresponding keys and a second left side corresponding key disposed at a middle among the left side corresponding keys or corresponds to a first right side corresponding key disposed at a top among the right side corresponding keys and a second right side corresponding key disposed at a middle among the right side corresponding keys.

7. The braille input device of claim 5, wherein a second left side multi key disposed at a next upper end among the left side multi keys or a second right side multi key disposed at a next upper end among the right side multi keys corresponds to a first left side corresponding key disposed at a top among the left side corresponding keys and a third left side corresponding key disposed at a bottom among the left side corresponding keys, or corresponds to a first right side corresponding key disposed at a top among the right side corresponding keys and a third right side corresponding key disposed at a bottom among the right side corresponding keys.

8. The braille input device of claim 5, wherein a third left side multi key disposed at a third upper part among the left side multi keys or a third right side multi key disposed at a third upper part among the right side multi keys corresponds to all of the left side corresponding keys or all of the right side corresponding keys.

9. The braille input device of claim 8, wherein a fourth left side multi key disposed at a fourth upper part among the left side multi keys or a fourth right side multi key disposed at a fourth upper part among the right side multi keys corresponds to a second left side corresponding key disposed at a middle among the left side corresponding keys and a third left side corresponding key disposed at a bottom among the left side corresponding keys, or corresponds to a second right side corresponding key disposed at a middle among the right side corresponding keys and a third right side corresponding key disposed at a bottom among the right side corresponding keys.

10. The braille input device of claim 5, wherein a third left side multi key disposed at a third upper part among the left side multi keys or a third right side multi key disposed at a third upper part among the right side multi keys corresponds to a second left side corresponding key disposed at a middle among the left side corresponding keys and a third left side corresponding key disposed at a bottom among the left side corresponding keys, or corresponds to a second right side corresponding key disposed at a middle among the right side corresponding keys and a third right side corresponding key disposed at a bottom among the right side corresponding keys.

11. The braille input device of claim 10, wherein a fourth left side multi key disposed at a fourth upper part among the left side multi keys or a fourth right side multi key disposed at a fourth upper part among the right side multi keys corresponds to all of the left side corresponding keys or all of the right side corresponding keys.

12. The braille input device of claim 3, wherein the right side multi keys are arranged in a right side multi key column disposed at a right side of the right side corresponding keys.

13. The braille input device of claim 1, wherein the keypad further comprises a mode change keys for converting the left side corresponding keys, the right side corresponding keys, the left side multi keys, or the right side multi keys into keys for inputting other characters comprising alphabetical characters or numbers.

14. A braille input device comprising:
a key pad comprising a plurality of keys,
wherein the keypad comprises:
three left side corresponding keys corresponding to three dots disposed at a left side column of braille;
three right side corresponding keys corresponding to three dots disposed at a right side column of braille;
four left side multi keys, each of the four left side multi keys corresponding to plural keys among the left side corresponding keys, wherein the four left side multi keys comprise three keys, each of the three keys corresponding to two different keys among the left side corresponding keys and one key corresponding to all of the left side corresponding keys; and
four right side multi keys, each of the four right side multi keys corresponding to plural keys among the right side corresponding keys, wherein the four right side multi keys comprise three keys, each of the three keys corresponding to two different keys among the right side corresponding keys and one key corresponding to all of the right side corresponding keys, and
wherein the four left side multi keys and the four right side multi keys are disposed at columns different from each other.

15. A braille input method comprising the steps of:
inputting at least one key of a key pad of a braille input device by a user; and
outputting an input signal for inputting braille to a host device, the braille comprising
a dot corresponding to the at least one key inputted into the braille input device,
wherein the at least one key comprises at least one among three left side corresponding keys corresponding to three dots disposed at a left side column of braille and a plurality of left side multi keys, each left side multi key corresponding to two or more keys of the left side corresponding keys and at least one among three right side corresponding keys corresponding to three dots disposed at a right side column of braille and a plurality of right side multi keys, each right side multi key corresponding to two or more keys of the right side corresponding keys, and
wherein the plurality of left side multi keys and the plurality of right side multi keys are disposed at columns different from each other.

16. The braille input method of claim 15, wherein the left side multi keys comprise three keys, each of the three keys corresponding to two different keys among the left side corresponding keys and one key corresponding to all of the left side corresponding keys, and
wherein the right side multi keys comprise three keys, each of the three keys corresponding to two different keys among the right side corresponding keys and one key corresponding to all of the right side corresponding keys.

* * * * *